US012724133B2

(12) United States Patent
Suess et al.

(10) Patent No.: US 12,724,133 B2
(45) Date of Patent: Sep. 1, 2026

(54) EMPIRICALLY MODELING EFFECT OF FOG ON LIDAR DATA

(71) Applicant: GM Cruise Holdings LLC, San Francisco, CA (US)

(72) Inventors: Ryan Suess, Seattle, WA (US); Guy Satat, Natick, MA (US); Michael Shagam, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 419 days.

(21) Appl. No.: 18/473,060

(22) Filed: Sep. 22, 2023

(65) Prior Publication Data

US 2025/0102647 A1 Mar. 27, 2025

(51) Int. Cl.
*G01S 7/497* (2006.01)
*G01S 7/4861* (2020.01)
*G01S 17/931* (2020.01)

(52) U.S. Cl.
CPC ............ *G01S 7/497* (2013.01); *G01S 7/4861* (2013.01); *G01S 17/931* (2020.01); *G01S 2007/4975* (2013.01)

(58) Field of Classification Search
CPC ...... G01S 7/497; G01S 7/4861; G01S 17/931; G01S 2007/4975
See application file for complete search history.

(56) References Cited

U.S. PATENT DOCUMENTS

2010/0121615 A1* 5/2010 Cunningham .......... G06F 17/18 703/2
2019/0138848 A1* 5/2019 Gonzalez Aguirre . G06N 3/084
2023/0154586 A1* 5/2023 Castle .................... G16H 50/50 703/11

OTHER PUBLICATIONS

Hahner et al. "Fog Simulation on Real LiDAR Point Clouds for 3D Object Detection in Adverse Weather" (Year: 2021).*
Teufel et al. "Simulating Realistic Rain, Snow, and Fog Variations for Comprehensive Performance Characterization of LiDAR Perception") (Year: 2022).*
Jiyoon et al. "Empirical Analysis of Autonomous Vehicle's LiDAR Detection Performance Degradation for Actual Road Driving in Rain and Fog" (Year: 2023).*
Bernier et al. "Statistical models for the lidar technology: false alarms, receiver operating characteristic curves, and Swerling models " (Year: 2022).*

* cited by examiner

*Primary Examiner* — Assres H Woldemaryam
(74) *Attorney, Agent, or Firm* — Honigman LLP; Matthew H. Szalach

(57) ABSTRACT

Systems and methods of simulating an effect of fog on a Light Detection and Ranging (LiDAR) sensor are disclosed. The method includes the steps of determining whether a target is present within the field-of-view (FOV) of the LiDAR sensor, determining a fog probability density function (PDFfog) vs range, modifying, if a target is present within the FOV, the PDFfog to account for the target, calculating a cumulative density function (CDF) for the PDFfog, randomly sampling the CDF to determine a plurality of ranges and additively plotting a predetermined Gaussian distribution centered on each range, and identifying a peak value of the additive plot and reporting the range associated with the peak value as the strongest return of the LiDAR unit.

20 Claims, 9 Drawing Sheets

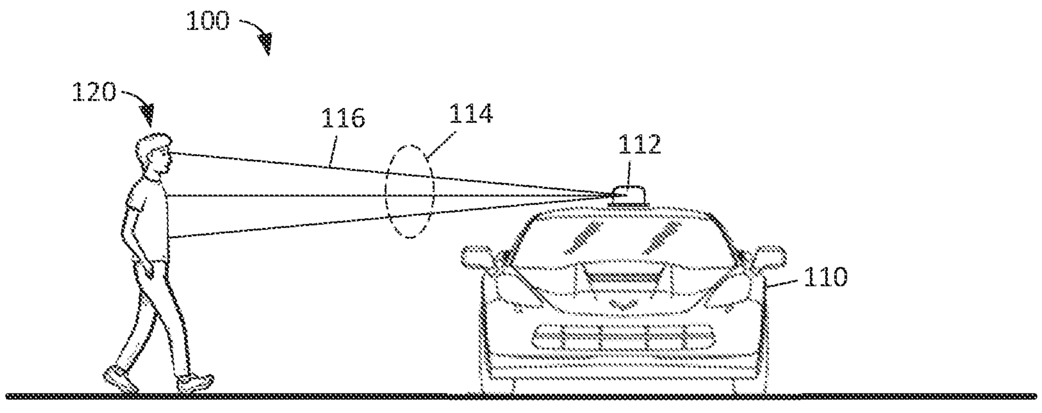
Fig. 1
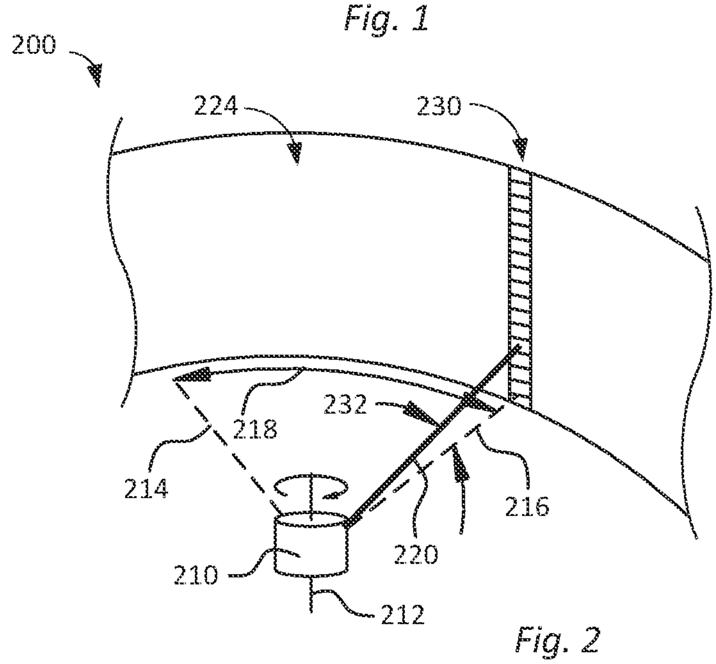
Fig. 2
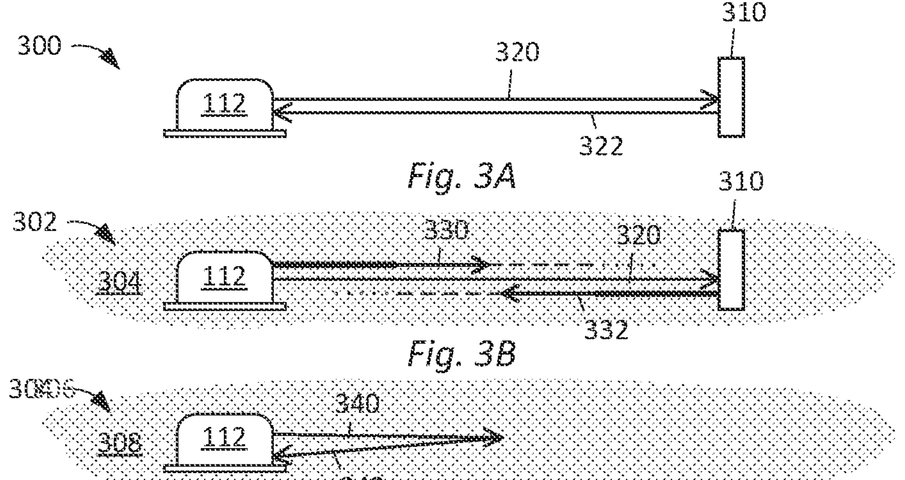
Fig. 3A
Fig. 3B
Fig. 3C

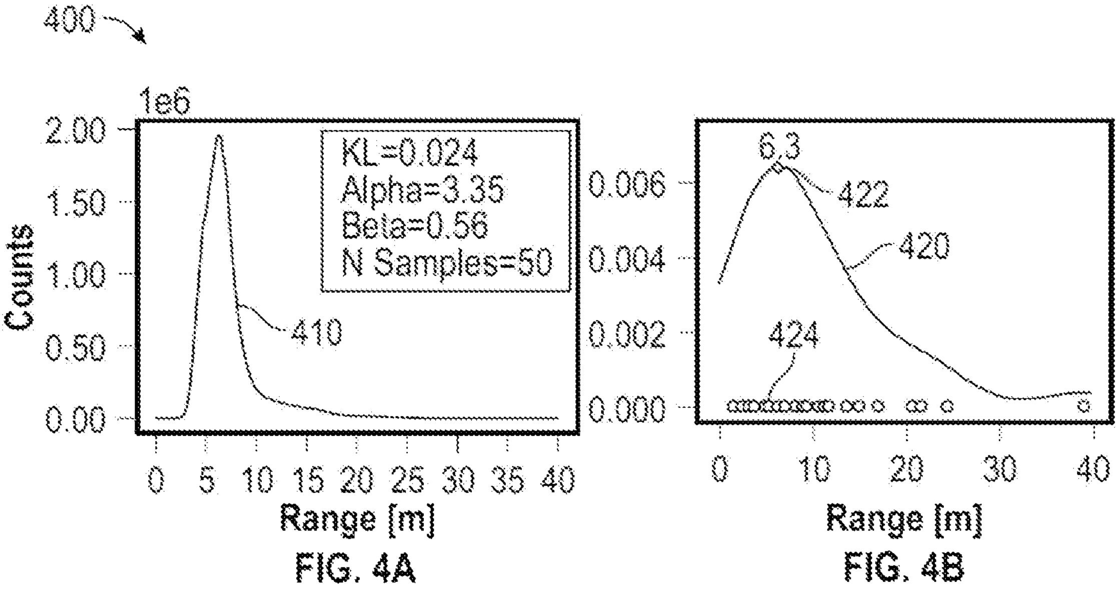
FIG. 4A
FIG. 4B
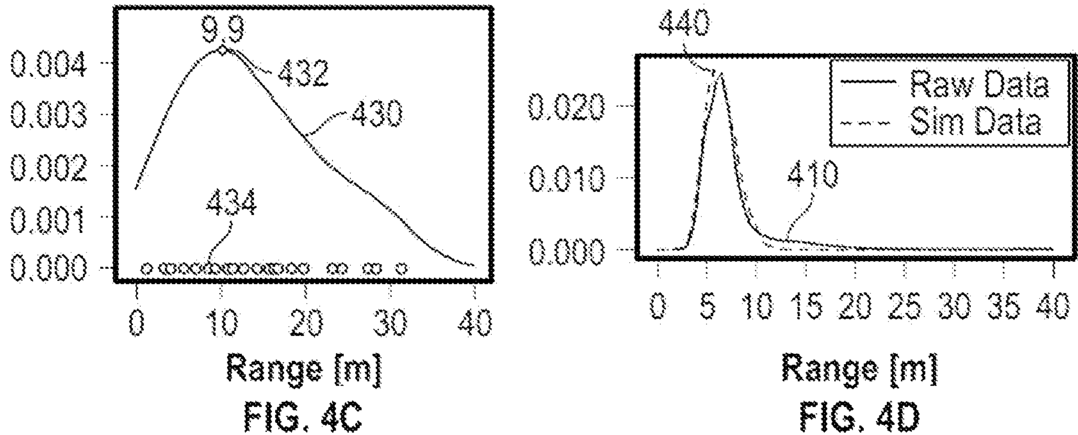
FIG. 4C
FIG. 4D

EMPIRICALLY MODELING EFFECT OF FOG ON LIDAR DATA

BACKGROUND

1. Technical Field

The present disclosure generally relates to modeling of fog, especially for a Light Detection And Ranging (LiDAR) sensor of an autonomous vehicle (AV).

2. Introduction

An AV often uses a LiDAR sensor to detect objects in the surrounding 3D environment. This type of sensing is challenged in adverse conditions where rain and/or fog induce scattering of the light pulse emitted by the LiDAR sensor. Rain and fog consist of small droplets of water suspended in the air. Each drop scatters and/or absorbs incident light, whether the illumination beam emitted by the LiDAR unit or the return beam reflected by an object. The effect of this scattering and absorption is an increase in false-negative returns that is more pronounced with longer distances to the actual target, thereby reducing the effective range of the LiDAR unit.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings.

FIG. 1 illustrates an example AV environment, according to some aspects of the disclosed technology.

FIG. 2 illustrates how a LiDAR sensor scans its environment, according to some aspects of the disclosed technology.

FIGS. 3A-3C illustrate how fog affects a LiDAR sensor, according to some aspects of the disclosed technology.

FIG. 4A depicts a real-world distribution of the strongest LiDAR returns over a range of fog density, according to some aspects of the disclosed technology.

FIGS. 4B-4C depicts two examples of determining a LiDAR range measurement, according to some aspects of the disclosed technology.

FIG. 4D depicts a comparison of a tuned model to the real-world distribution of FIG. 4A, according to some aspects of the disclosed technology.

DETAILED DESCRIPTION

Figure 5:
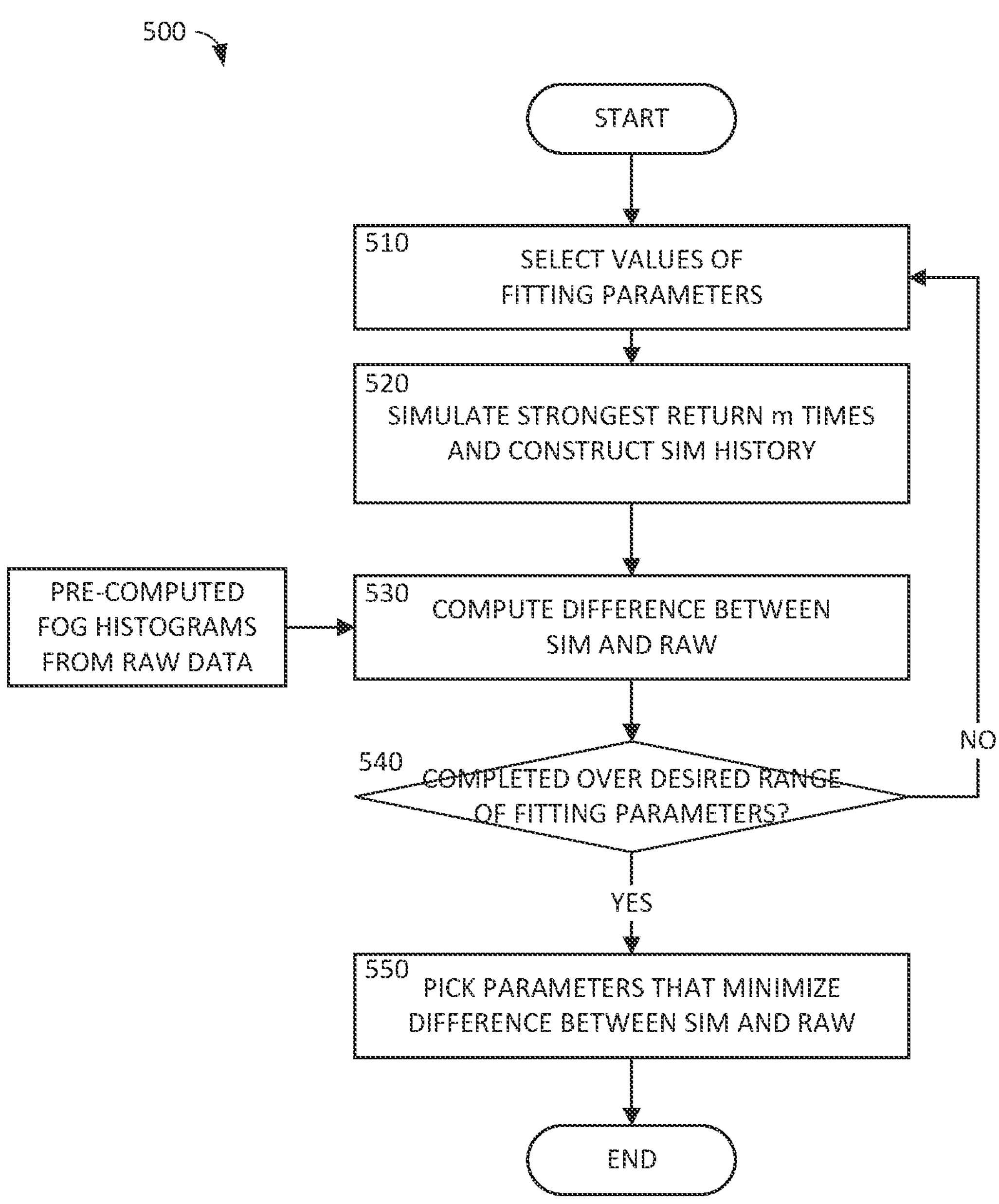
FIG. 5 depicts an example workflow for fitting a simulation of a LiDAR return to real-world data, according to some aspects of the disclosed technology.

The detailed description set forth herein is intended as a description of various example configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. It will be clear and apparent that the subject technology is not limited to the specific details set forth herein and may be practiced without these details. In some instances, structures and components are shown in block diagram form to avoid obscuring the concepts of the subject technology.

AV navigation systems require information about the surrounding environment in order to avoid objects/entities as well as navigate through the environment. The AV perceives objects around itself through multiple types of sensors, e.g., imaging cameras and LiDAR sensors. LiDAR sensing is degraded in adverse conditions, e.g., where fog induces scattering of the projected illumination beam and may create a reflected signal that is interpreted by the LiDAR unit as a return, with a reported range, when there is physically no target present at the reported range. Fog consists of polydisperse droplets having diameters on the order of 1 to 100 microns. Any direct ray from the source of light is scattered by a drop but not uniformly, partly by external and partly by internal reflection. A portion of the energy of the light is also absorbed by each droplet of water that, with enough encounters of water droplets, may terminate the light before it reaches a target or on the return path to the LiDAR unit. Understanding the nature of the effect of fog on a LiDAR system is critical to improving real-world performance.

The systems and methods disclosed a method of modeling the effect of fog on light, e.g., empirically simulating the signal returns of a LiDAR unit in a foggy environment. The shape parameters of a gamma-distribution are adjusted to match real-world data extracted from LiDAR units operating in certain fog environments. Randomly sampling the adjusted distribution provides a simulated return and additively plotting a large number of the simulated retuned enables selection of a single strongest return that is provided as an input to the AV navigation system that can be used to develop and/or train it to properly respond in a foggy environment.

Fog can be treated as a "participating media" in which both scattering and absorption occur. There is a random propagation mean free path (MFP) distance before an absorbing event and a different MFP for a scattering event. The inverse of these MFPs are the absorption and scattering coefficients that, in certain embodiments, are grouped together as an "extinction coefficient" because they both cause signal loss. such as fog, the distance 414 is a random number selected from a distribution having a mean that is equal to the MFP FIG. 1 illustrates an example AV environment 100, according to some aspects of the disclosed technology. A LiDAR system 112 is disposed on a vehicle 110 (e.g., an AV) and configured to emit an array 114 of light beams 116 and detect a return of each light beam 116 if reflected by a target 120, e.g., a person. In certain embodiments, the LiDAR system 112 comprises multiple sets of emitters and detector to simultaneously emit multiple beams 116. In certain embodiments, the LiDAR system 110 has a sparse illumination and/or detector configuration. If the light beams of the array FIG. 2 illustrates how a scanning LiDAR sensor 210 scans its environment 200, according to some aspects of the disclosed technology. The sensor 210 rotates about an axis 212 within the LiDAR system 112 that is fixed to the AV 110. In certain embodiments, each emitter of the emitter/receiver array (not visible in FIG. 2) emits an illuminating beam 220 at a common rotational angle 218 from the fixed rotational reference line 214 and at an individual vertical angle 232 from the rotating reference line 216. In this depiction, each beam 220 is associated with a single point of the vertical swath 230. Detection of a return beam indicates that there is a target along the respective light beam 220. As the LiDAR sensor 210 rotates, it will scan the entire cylindrical surface 224. i.e., the field-of-view (FOV) of the LiDAR sensor 210. A data set containing the return beam intensity and TOF for all points of all the vertical swaths is a "frame" of data.

The AV 110 "perceives" an object that is within the FOV 224 by evaluating the sensor outputs, e.g., each LiDAR receiver detects one or more reflections of the light pulse projected by its associated emitter. The LiDAR system 112 records the rotational and vertical angles of the beam 220 and the time-of-flight (TOF) for each reflection, i.e., the time from emission of the light beam 220 to detection of the reflection. In certain embodiments, this information is stored in an array of "bins" that are associated with predetermined rotational and vertical positions with the FOV 224. The LiDAR system 11 analyzes the reflections and determines that an object exists at a specific location, as is known to those of skill in the art and provides a signal. In certain embodiments, the LiDAR system 112 signal comprises a "strongest return" and the associated distance from the LiDAR to the object that reflected the strongest return.

The AV 110 then attempts to classify the object that reflected the strongest return. In certain embodiments, e.g., when it is foggy, the AV 110 determines that the strongest return distance is associated with a reflection from the environment, e.g., fog, and classifies the return as "speckled," which is considered noise, because it resembles laser speckle random noise texture that is temporally varying.

FIG. 3A illustrates scenario 300 of how a LiDAR sensor 112 is intended to operate, according to some aspects of the disclosed technology. The LiDAR sensor 112 emits an illuminating beam 320 toward a target 310. The beam 320 reaches the target 310 and is reflected, creating a return beam 322 that reaches the receiver of the LiDAR sensor 112. The TOF for the beams 320 and 322 can be converted to a distance between the LiDAR sensor 112 and the target 312 by method known to those of skill in the art.

FIG. 3B illustrates scenario 302 how an illuminating beam 330 and a return beam 332 can be lost, according to some aspects of the disclosed technology. The LiDAR sensor 112 emits an illuminating beam 330 toward a target 310. The fog 304 is thick and disperses the beam 330 such that the beam 330 does not reach the target 310, thus does not create a reflection.

Alternately, the LiDAR sensor 112 emits an illuminating beam 320 toward the target 310. The beam 320 reaches the target 310 and is reflected, creating a return beam 332 directed toward the LiDAR sensor 112. The fog 304 disperses the return beam 332 such that the receiver does not detect a return.

In both cases, the LiDAR sensor 112 does not detect a return even though there is a physical target 310 within the nominal range of the LiDAR sensor 112. This is considered a "false negative" return.

FIG. 3C illustrates how fog can create a return, according to some aspects of the disclosed technology. The LiDAR sensor 112 emits an illuminating beam 340. The is no target on the path of the beam 340 within the nominal range of the LiDAR sensor 112, which should result in no return being detected by the receiver associated with beam 340. In this scenario, however, a portion of the fog 308 is so thick that it reflects enough of the beam 340 to create a return beam 342 toward the receiver associated with beam 340. The return beam 342 is strong enough to be detected by the receiver and a time-of-flight is recorded, even though there is no physical target within the nominal range of the LiDAR sensor 112. This is considered a "false positive" return.

It is possible to review the LiDAR records and recorded visual images at a later time and determine which returns are "true," e.g., either a negative return when there is no object in range or a positive return from a physical object, false negative, or false positive. Representative records of the LiDAR signals collected from operation in the real world and the associated presence/absence of targets and their computed distances are considered "road data."

FIG. 4A depicts a real-world distribution of the strongest LiDAR returns from fog over a specific range of fog density, according to some aspects of the disclosed technology. LiDAR road data was collected and 55 road segments of real-world output of a LiDAR unit were selected. Each segment was ~200 frames long. A list of all detected "strongest returns" was created for each frame. This list was filtered to include only points classified as "speckle," which is used herein as a category for a false-positive return from a scattering environment, e.g., the return was created by the fog, which is referred to herein as a "soft return," and not a real target, which is referred to herein as a "hard return." The list of x, y, z coordinates of each point was converted to a single value range (Euclidean distance to sensor). The strongest return ranges of each of the filtered data points were plotted as a histogram 400 over a range of 0-40 m to form curve 410.

Fog Probability Distribution

The fog-only probability $P_{Fog}$ is given by the following equation (1):

$$P_{Fog}(z) = P_{D,f}\ \text{Gamma}\ (z; \alpha, \beta)\ [\text{units of } m^{-1}] \qquad \text{Eqn.(1)}$$

In the above expression, $P_{D,f}$ (unitless) defines the probability of detection of fog, Gamma is the gamma distribution, and $\alpha$ (unitless) and $\beta$ ($m^{-1}$) respectively define the shape and rate parameters of false-positive fog returns. The domain of Eqn. (1) is for z>0. The gamma function has historically been used to model fog and other "participating media" that cause scatter. While we use the gamma function here to model the fog-only probability distribution, the method described here can use another function or data if it is available (the gamma function is chosen primarily for its convenient parameterization via the shape and rate parameters).

Integrating Eqn. (1) over the range yields a value of $P_{D,f}$. To account for the fact that there could be no return from the fog, we consider an additional outcome of the light being lost due to absorption and scattering with the probability $1-P_{D,f}$.

$$P_{Lost} = 1 - P_{D,f} \quad \text{Eqn.(2)}$$

This outcome, plus the total integrated probability density of Eqn. (1) covers all outcomes for the photon when it interacts with fog (i.e., the photon backscatters to the detector from fog at range z, or does not backscatter to the detector at any range). Equations (1, 2) give the complete description of photon outcomes in the presence of fog with no target present.

Target-In-Fog Probability Distribution

To construct the target-in-fog probability distribution, the fog probability distribution is modified to accommodate the presence of the target. This probability distribution will have contributions from both the fog and the target and the method of construction assumes that the fog and target distributions can be treated as independent and that the probability of detecting a target is decreased by the presence of fog.

The reduced density is $$b_R(z) = P_{D,f}\ \text{Gamma}\ (z; \alpha, \beta)[m-1]0 \le z < z_{Target} \quad \text{Eqn.(3)}$$

The subscript (R) denotes that this is the reduced density.

Eqn. (3) is identical to Eqn. (1) with the exception of the domain over which it applies, e.g., it is reduced in Eqn. (3) to be less than the target distance. The total probability of being scattered by fog is thus lower from that of the non-reduced distribution by a factor $F(z_{Target}; \alpha, \beta)$.

$$P_{Fog,R} = \int_0^{\infty} b_R(z)dz = \int_0^{z_{Target}} b_R(z)dz = P_{D,f}F(z_{Target}; \alpha, \beta) \quad \text{Eqn.(4)}$$

The unitless factor $F(z_{Target}; \alpha, \beta)$ denotes the cumulative distribution function of the gamma distribution evaluated at $z_{Target}$, also referred to as "$z_{Target}$" herein.

The LiDAR probability of detection is given by Eqn. (5)

$$P_d(z, \rho_e = \rho\cos\phi; A, z_0) = \frac{1}{2}erfc\left[A\left(1 - \rho_e z_0^2/z^2\right)\right] \quad \text{Eqn.(5)}$$

Eqn. 5 is an empirical equation that captures the distance at which the probability of detection is equal to 0.5 (denoted by $z_0$). In Eqn. (5), the target reflectance and angle between the incident lidar beam and target local surface normal is denoted by ρ and ϕ, respectively. The parameter A stretches or compresses the complementary error function (denoted erfc).

To incorporate the impact of fog on the probability of detection, we multiply Eqn. (5) by the probability of interacting with the target, and a $(1-P_{Fog,R})$ additional loss term $\exp(-2\gamma z_{Target})$ that factors the probability of light scattering from fog on the paths from source to target, and target to detector.

$$P_{D,Target} = \exp(-2\gamma z_{Target})(1 - P_{Fog,R})P_d(z_{Target}, \rho_e; A_j, z_0) \quad \text{Eqn.(6)}$$

The probability of detecting the target cannot be greater than the probability of interacting with the target, and the additional loss term depends on an additional free parameter γ, which has units of inverse distance, and is related to the fog severity. The additional loss term helps further reduce the target probability in a way that can be fit to observed data and is physically motivated by the diffusion limit of the radiative transfer equation.

The probability of missing a return is trivially given by Eqn. (7).

$$P_{Lost,Target} = 1 - P_{D,Target} - P_{Fog,R} \quad \text{Eqn.(7)}$$

The sum of Eqns. (4, 6, 7) is unity, indicating that all outcomes for a photon in our target-in-fog probability distribution are appropriately accounted for Equations (4,6,7) give the complete description of photon outcomes for a target-in-fog scenario.

Model Fitting

Because of the signal processing of the lidar unit (which is generally unknown to the user), the fog scattering PDF is different from the distribution measured by the lidar unit. To reproduce the distribution measured by the lidar unit, a small number of points are randomly sampled from a fog probability density function (PDFfog), also referred to as "PDF-fog" herein to emulate the action of making a measurement with the LiDAR unit. The sampled probability distribution is a PDF described by Eqn. (1) or another appropriate distribution. How the PDF is sampled affects the variance of the values estimated from the sampled distribution and thus the number of samples is a free parameter. The sampling is performed using the conventional approach of calculating the cumulative distribution function (CDF) from the PDF and then using the inverse transform sampling.

Next a kernel density estimator (KDE) is used to produce a proxy for the LiDAR measurement. The KDE bandwidth (h) is also a free parameter. The combination of the sampling and the KDE algorithm produces a different LiDAR measurement curve every time the PDF/CDF is sampled.

FIGS. 4B-4C depicts two examples of determining a LiDAR range measurement, according to some aspects of the disclosed technology. The dots along the bottom of each plot are the randomly sampled points from the PDF. The curves 420, 430 are the KDE infilled curves derived from the respective dots. Curve 420 has a peak value, i.e., the strongest return, at a range of 6.3 m (422). Curve 430 has its strongest return at a range of 9.9 m (432).

FIG. 4D depicts a comparison of a tuned model to the real-world distribution of FIG. 4A, according to some aspects of the disclosed technology. The curves 410 and 440 are the probability distributions of detected peak locations as a function of range for raw data and sim data respectively. The free parameters for fitting the model to the data are:

- a shape parameter (α) associated with a gamma function
- a rate parameter (β) associated with a gamma function
- a bandwidth (h) associated with the KDE
- a number (N) of how many times the sampling of the real-world CDF is repeated The curves 410, 440 of FIG. 4D suggests that the model is a good fit around the main peak and is underestimating the long tail of the distribution.

FIG. 5 depicts an example workflow 500 for fitting a simulation of a LiDAR return to real-world data, according to some aspects of the disclosed technology. Values for the various fitting parameters, e.g., a, B, h, N, are selected in step 510. The data and processing discussed with respect to FIG. 4A-D are performed in step 520 to produce a simulated histogram similar to curve 440.

Step 530 compares the simulated curve (similar to curve 440) to the real-data curve (similar to curve 410). In certain embodiments, a quantitative comparison is done with a Kullback-Leibler (KL) divergence. We note that KL=0 means the distributions are identical and KL=1 means complete entropy. Decision point 540 repeats steps 510 through 530 over a range of fitting parameters, e.g., a, B, h, N. When the entire range has been evaluated, the process branches to step 550 in which the parameters that minimize the difference between the simulated and real-world histograms are selected.

Figure 6:
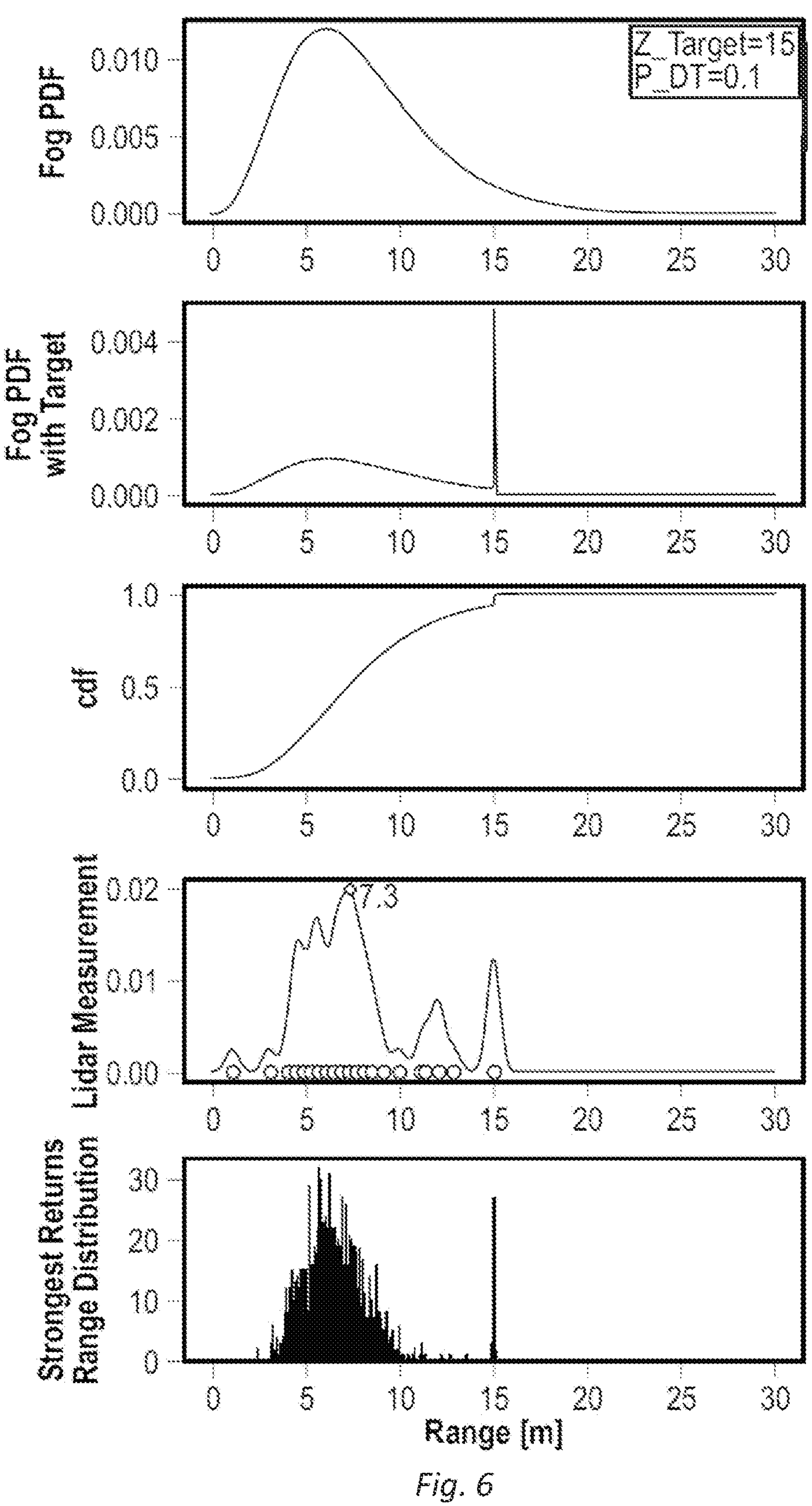
FIGS. 6-8 graphically depicts an example process of identifying a simulated strongest LiDAR return with different simulation parameters, according to some aspects of the disclosed technology.

FIG. 6 depicts the simulation of a target placed at 15 m using a $P_{D,Target}$=0.1 and a $P_{D,Fog}$=0.08, which is equivalent to a meteorological optical range visibility of about 100 m, with an extinction coefficient of about 0.03/m. The top plot depicts the fog-only PDF and the second plot depicts the target-in-fog PDF. The third plot is the target-in-fog CDF. The fourth plot shows an example simulated measurement with a peak value (the strongest return) at a range of 7.3 m. The fifth plot is a histogram of the peak values from many simulated measurements, which is equivalent to the simulated histogram curve 440 of FIG. 4D. There is a spike at 15 m, which are the true-positive returns, but a much larger number of false-positive returns at 3-12 m.

Figure 7:
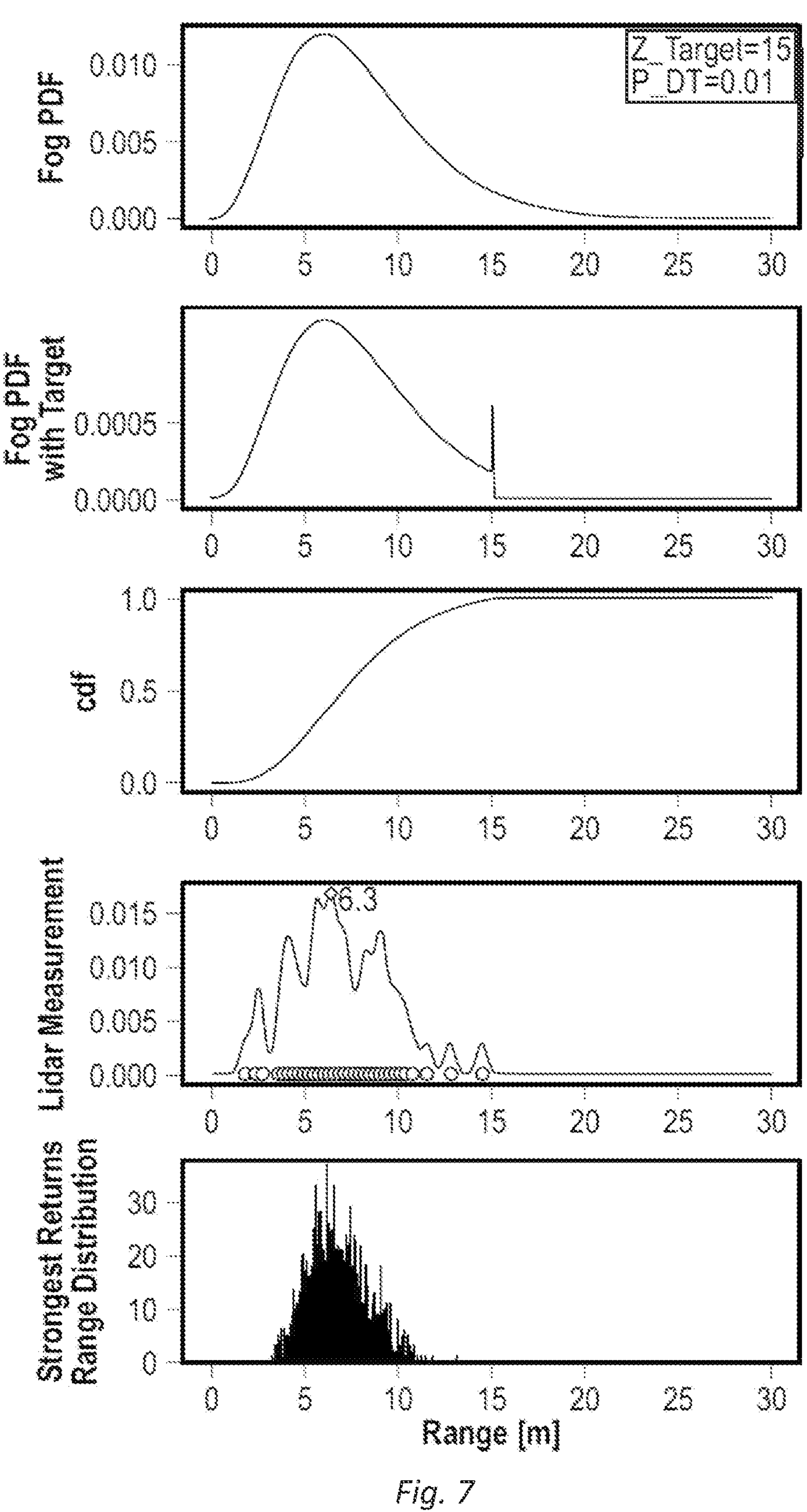

FIG. 7 depicts the simulation of the same target in the same fog ($P_{D,Fog}$=0.08) using a $P_{D,Target}$=0.01. The strongest return is similar but the fifth plot of the simulated histogram curve is completely missing a true-return signal at 15 m. The smaller target detection probability has eliminated the ability of the LiDAR unit to detect the target at 15 m.

Figure 8:
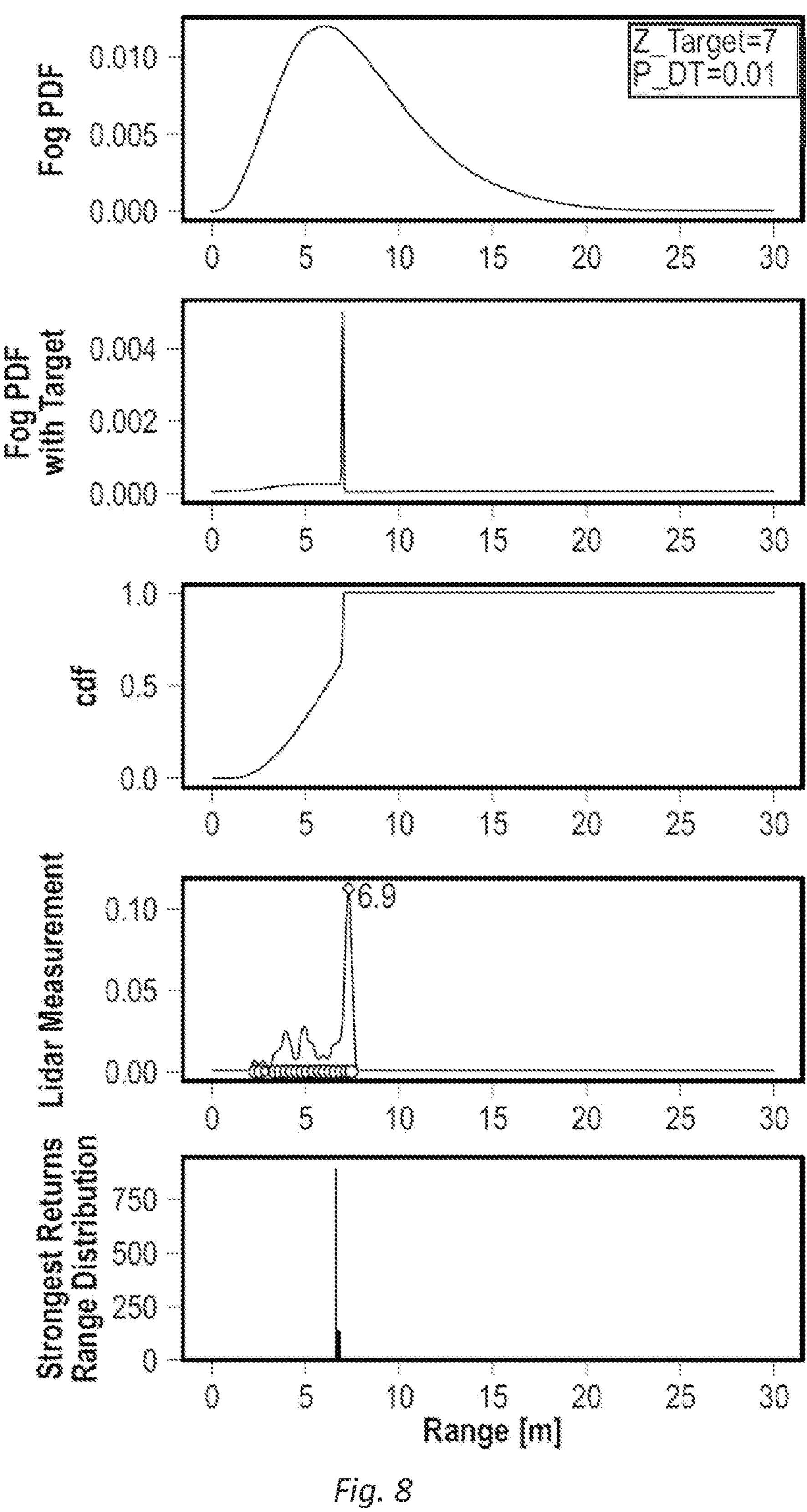

FIG. 8 depicts the simulation of the target at 7 m in a less-dense fog ($P_{D,Fog}$=0.02) using the same $P_{D,Target}$=0.01 as FIG. 7. The target signal in the second plot is much larger than the fog returns and the simulated histogram curve of the fifth plot is almost entirely the true-return signal at 7 m.

Figure 9:
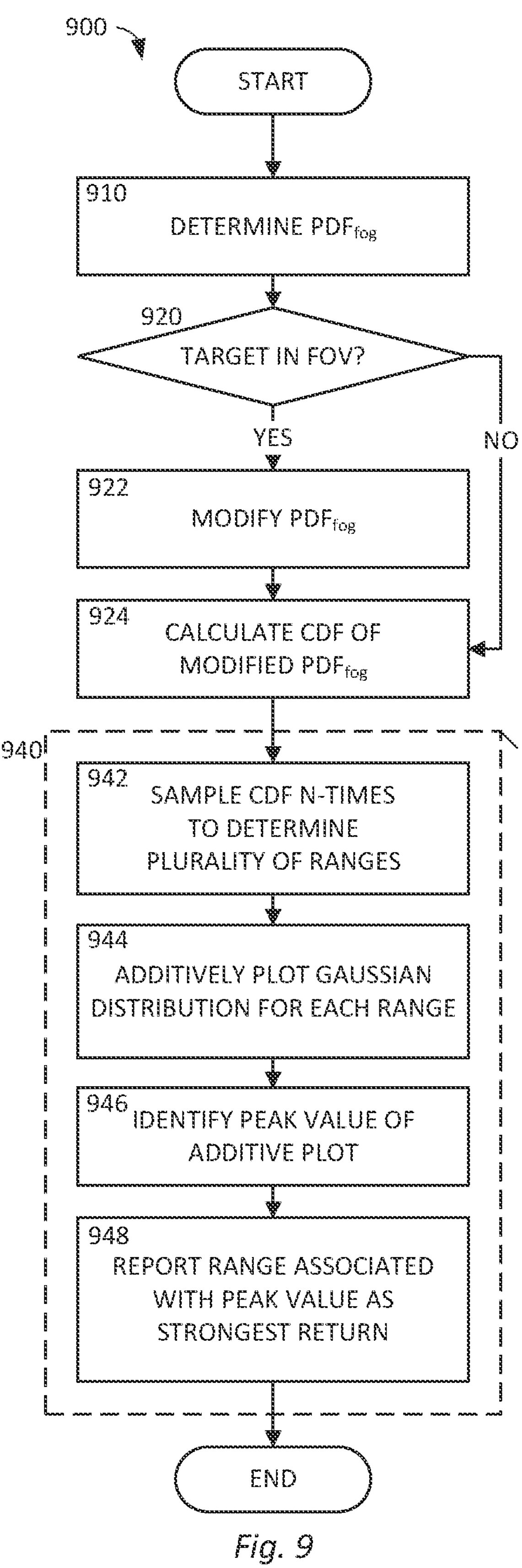
FIG. 9 depicts an example workflow for simulating a LiDAR return, according to some aspects of the disclosed technology.

FIG. 9 depicts an example workflow 900 for simulating a LiDAR return, according to some aspects of the disclosed technology. Step 910 determines the probability density function for the fog ($PDF_{fog=PFog}$). Step 920 assesses whether a target is within the field-of-view (FOV) and the nominal range of the LiDAR unit. If a target is within the FOV and within range, the process branches to step 922 to modify the PDF of step 910 to reflect the presence of the target then ($PDF_{fog} \rightarrow P_{D,Target}$) proceed to step 9924 that calculates the cumulative density function (CDF) of the modified PDF. If there is no target within the FOV or within range, the process branches directly from step 920 to step 924 and calculates the CDF of the fog-only PDF.

Block 940 are a series of steps 942, 944, 946, 948 that are performed for each simulation of a LiDAR return. Step 942 is repeated N times to determine N returned ranges. Each returned range is plotted in step 944 as a Gaussian distribution and all the plotted distributions are added together. Step 946 identifies the peak value of the additive plotting of the returns and step 948 reports a "strongest return" range that is associated with the peak value.

Figure 10:
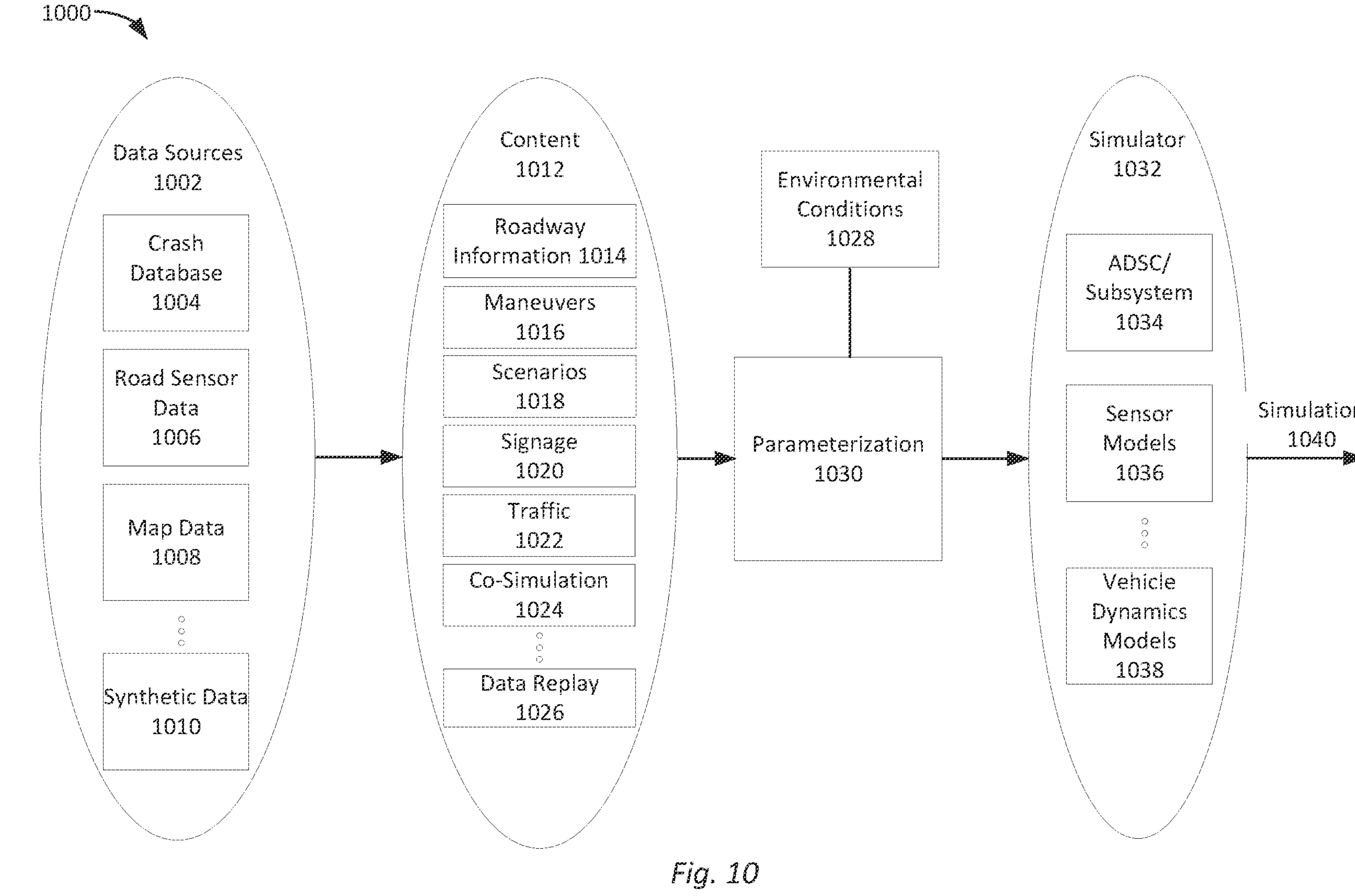
FIG. 10 is a diagram illustrating an example simulation framework, according to some aspects of the disclosed technology.

FIG. 10 is a diagram illustrating an example simulation framework 1000, according to some examples of the present disclosure. The example simulation framework 1000 includes data sources 1002, content 1012, environmental conditions 1028, parameterization 1030, and a simulator 1032. The components in the example simulation framework 1000 are merely illustrative examples provided for explanation purposes. In certain embodiments, the simulation framework 1000 includes other components that are not shown in FIG. 10 and/or more or less components than shown in FIG. 10.

In certain embodiments, the data sources 1002 are used to create a simulation. In certain embodiments, the data sources 1002 include one or more of a crash database 1004, road sensor data 1006, map data 1008, and/or synthetic data 1010. In certain embodiments, the data sources 1002 include more or less sources than shown in FIG. 10 and/or one or more data sources that are not shown in FIG. 10.

In certain embodiments, the crash databases 1004 includes crash data, e.g., data describing crashes and/or associated details, generated by vehicles involved in crashes. In certain embodiments, the road sensor data 1006 includes data collected by one or more sensors, e.g., camera sensors, LiDAR sensors, RADAR sensors, SONAR sensors, IMU sensors, GPS/GNSS receivers, and/or any other sensors, of one or more vehicles while the one or more vehicles drive/navigate one or more real-world environments. In certain embodiments, the map data 1008 includes one or more maps and, in some cases, associated data, e.g., a high-definition (HD) map, a sensor map, a scene map, and/or any other map. In some embodiments, the HD map includes roadway information, e.g., a lane width, a location of a road sign and/or a traffic light, a direction of travel for a lane, road junction information, and speed limit information.

In certain embodiments, the synthetic data 1010 includes one or more of a virtual asset, an object, and/or an element created for a simulated scene, a virtual scene, a virtual scene element, and any other synthetic data element. In certain embodiments, the synthetic data 1010 includes one or more of a virtual vehicle, a virtual pedestrian, a virtual road, a virtual object, a virtual environment/scene, a virtual sign, a virtual background, a virtual building, a virtual tree, motorcycle, a virtual bicycle, a virtual obstacle, a virtual environmental element, e.g., weather and/or lightning, a shadow, and/or a virtual surface. In certain embodiments, the synthetic data 1010 includes synthetic sensor data such as synthetic camera data, synthetic LiDAR data, synthetic RADAR data, synthetic IMU data, and/or any other type of synthetic sensor data.

In certain embodiments, data from one or more of the data sources 1002 is be used to create the content 1012. In certain embodiments, the content 1012 includes static content and/or dynamic content. In certain embodiments, the content 1012 includes roadway information 1014, a maneuver 1016, a scenario 1018, signage 1020, traffic 1022, a co-simulation 1024, and/or data replay 1026. In certain embodiments, the roadway information 1014 includes one or more of lane information, e.g., number of lanes and/or lane widths and/or directions of travel for each lane, the location and information of a road sign and/or a traffic light, road junction information, speed limit information, a road attribute, e.g., surfaces and/or angles of inclination and/or curvatures and/or obstacles, road topologies, and/or other roadway information. In certain embodiments, the maneuver 1016 include any AV maneuver and the scenario 1018 includes a specific AV behavior in a certain AV scenes/environment. The signage 1020 includes one or more signs, e.g., a traffic light, a road sign, a billboard, and α message displayed on the road. In certain embodiments, the traffic 1022 includes traffic information such as traffic density, traffic fluctuations, traffic patterns, traffic activity, delays, positions of traffic, velocities, volumes of vehicles in traffic, geometries or footprints of vehicles, pedestrians, and occupied and/or unoccupied spaces.

In certain embodiments, the co-simulation 1024 includes a distributed modeling and simulation of different AV subsystems that form the larger AV system. In certain embodiments, the co-simulation 1024 includes information for connecting separate simulations together with interactive communications. In certain embodiments, the co-simulation 1024 allows for modeling to be done at a subsystem level while providing interfaces to connect the subsystems to the rest of the system, e.g., the autonomous driving system computer. In certain embodiments, the data replay 1026 includes replay content produced from real-world sensor data, e.g., road sensor data 1006.

The environmental conditions 1028 include information about environmental conditions 1028, e.g., atmospheric conditions. In certain embodiments, the environmental conditions comprise one or more of road/terrain conditions such as surface slope or gradient, surface geometry, surface coefficient of friction, road obstacles, illumination, weather, road and/or scene conditions resulting from one or more environmental conditions.

In certain embodiments, the content 1012 and the environmental conditions 1028 are used to create the parameterization 1030. In certain embodiments, the parameterization 1030 includes parameter ranges, parameterized scenarios, probability density functions of one or more parameters, sampled parameter values, parameter spaces to be tested, evaluation windows for evaluating a behavior of an AV in a simulation, scene parameters, content parameters, and environmental parameters. In certain embodiments, the parameterization 1030 is used by a simulator 1032 to generate a simulation 1040.

In certain embodiments, the simulator 1032 includes a software engine, an algorithm, a neural network model, and/or a software component used to generate simulations, such as simulation 1040. In certain embodiments, the simulator 1032 includes one or more of an autonomous driving system computer (ADSC)/subsystem model 1034, a sensor model 1036, and a vehicle dynamics model 1038. In certain embodiments, the ADSC/subsystem model 1034 includes a model, a descriptor, and/or an interface for one or more of the ADSC and/or the ADSC subsystems, e.g., a perception stack 112, a localization stack 114, a prediction stack 116, a planning stack 118, a communications stack 120, a control stack 122, a sensor system, and/or any other subsystems.

In certain embodiments, the sensor model 1036 includes a mathematical representation of a hardware sensor and an operation, e.g., sensor data processing, of one or more sensors, e.g., a LiDAR, a RADAR, a SONAR, a camera sensor, an IMU, and/or any other sensor. In certain embodiments, sensor model 1036 includes a LiDAR sensor model that simulates operation of a LiDAR sensor, e.g., a LiDAR sensor model used to simulate transmission of LiDAR beams in the simulation 1040 and simulate LiDAR measurements such as range, and/or intensity corresponding to one or more objects in the simulation 1040. In certain embodiments, the vehicle dynamics model 1038 models one or more of a vehicle behavior/operation, a vehicle attribute, a vehicle trajectory, and a vehicle position.

Figure 11:
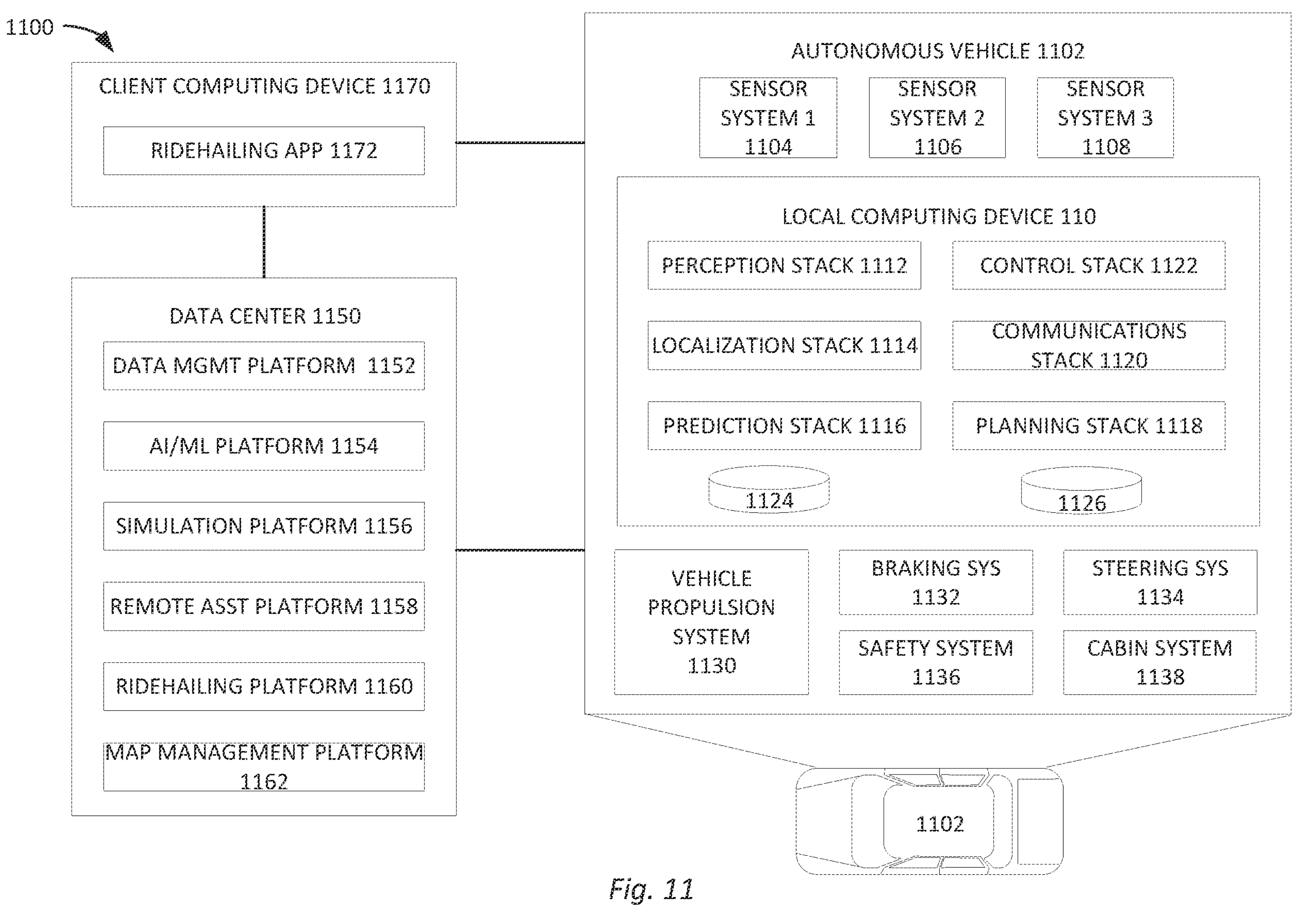
FIG. 11 is a diagram illustrating an example system environment that can be used to facilitate AV navigation and routing operations, according to some aspects of the disclosed technology.

FIG. 11 is a diagram illustrating an example system environment that can be used to facilitate AV navigation and routing operations, according to some aspects of the disclosed technology. One of ordinary skill in the art will understand that, for AV environment 1100 and any system discussed in the present disclosure, there can be additional or fewer components in similar or alternative configurations. The illustrations and examples provided in the present disclosure are for conciseness and clarity. Other embodiments may include different numbers and/or types of elements that do not depart from the scope of the present disclosure.

In this example, the AV environment 1100 includes an AV 1102, a data center 1150, and a client computing device 1170. The AV 1102, the data center 1150, and the client computing device 1170 communicate with one another over one or more networks (not shown) such as a public network, e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network such as a multi-cloud or hybrid-cloud network.

In certain embodiments, the AV 1102 navigates a roadway without a human driver based on sensor signals generated by multiple sensor systems 1104, 1106, and 1108. In certain embodiments, the sensor systems 1104-1108 include one or more types of sensors arranged about the AV 1102. In certain embodiments, the sensor systems 1104-1108 include one or more of an Inertial Measurement Unit (IMU), a camera such as a still image cameras and/or a video camera, a light sensor such as a LIDAR system and/or an ambient light sensor and/or an infrared sensor, a RADAR system, a GPS receiver, an audio sensor such as a microphone and/or a SOund Navigation And Ranging (SONAR) system and/or an ultrasonic sensors, an engine sensor, a speedometer, a tachometer, an odometer, an altimeter, a tilt sensor, an impact sensor, an airbag sensor, a seat occupancy sensor, an open/closed door sensor, a tire pressure sensor, and a rain sensor. For example, the sensor system 1104 can be a camera system, the sensor system 1106 can be a LIDAR system, and the sensor system 1108 can be a RADAR system.

In certain embodiments, the AV 1102 includes a mechanical system used to maneuver or operate the AV 1102. In certain embodiments, the mechanical system includes one or more of a vehicle propulsion system 1130, a braking system 1132, a steering system 1134, a safety system 1136, and a cabin system 1138. In certain embodiments, the vehicle propulsion system 1130 includes one or more of an electric motor and an internal combustion engine. In certain embodiments, the braking system 1132 includes an engine brake, brake pads, actuators, and/or any other suitable componentry configured to assist in decelerating the AV 1102. In certain embodiments, the steering system 1134 includes componentry configured to control the direction of movement of the AV 1102. In certain embodiments, the safety system 1136 includes lights and signal indicators, a parking brake, and airbags. In certain embodiments, the cabin system 1138 includes a cabin temperature control system and/or an in-cabin entertainment system. In certain embodiments, the AV 1102 does not include one or more human driver actuators, e.g., a steering wheel, a handbrake, a brake pedal, an accelerator pedal, a turn signal lever, a window wipers control. In certain embodiments, the cabin system 1138 comprises one or more client interfaces, e.g., a Graphical User Interfaces (GUI) and/or a Voice User Interfaces (VUI), for controlling certain aspects of the mechanical systems 1130-1138.

In certain embodiments, the AV 1102 includes a local computing device 1110 that is in communication with the sensor systems 1104-1108, the mechanical systems 1130-1138, the data center 1150, and the client computing device

1170, among other systems. In certain embodiments, the local computing device 1110 comprises one or more of a processor and α memory, including instructions to be executed by the processor. In certain embodiments, the instructions comprise one or more software stacks or components responsible for controlling the AV 1102, communicating with the data center 1150 and/or the client computing device 1170 and/or and other systems, receiving inputs from riders and/or passengers and/or and other entities within the AV's environment, and logging metrics collected by the sensor systems 1104-1108. In this example, the local computing device 1110 includes a perception stack 1112, a localization stack 1114, a prediction stack 1116, a planning stack 1118, a communications stack 1120, a control stack 1122, an AV operational database 1124, and an HD geospatial database 1126.

In certain embodiments, the perception stack 1112 enables the AV 1102 to "see," e.g., via cameras and/or LIDAR sensors, "hear," e.g., via a microphone, and "feel," e.g., via a pressure sensor or a force sensor or an impact sensor, its environment using information from the sensor systems 1104-1108, the localization stack 1114, the HD geospatial database 1126, other components of the AV, and other data sources, e.g., the data center 1150 and/or the client computing device 1170 and/or third party data sources. In certain embodiments, the perception stack 1112 detects and classifies an object and determine one or more of its current location, speed, and direction. In certain embodiments, the perception stack 1112 determines the free space around the AV 1102, e.g., to maintain a safe distance from other objects and/or change lanes and/or park the AV. In certain embodiments, the perception stack 1112 identifies environmental uncertainties, such as where to look for moving objects and flag areas that may be obscured or blocked from view. In certain embodiments, an output of the perception stack 1112 is a bounding area around a perceived object that is associated with a semantic label that identifies the type of object within the bounding area, the kinematic of the object, e.g., information about its movement and/or a tracked path of the object, and a description of the pose of the object, e.g., its orientation or heading.

In certain embodiments, the localization stack 1114 determines the AV's position and orientation/pose using different methods from multiple systems, e.g., GPS, IMUs, cameras, LIDAR, RADAR, ultrasonic sensors, the HD geospatial database 1126. In certain embodiments, the AV 1102 compares sensor data captured in real-time by the sensor systems 1104-1108 to data in the HD geospatial database 1126 to determine the AV's position and orientation. In certain embodiments, the AV 1102 focuses its search based on sensor data from one or more first sensor systems, e.g., the GPS, by matching sensor data from one or more second sensor systems, e.g., the LIDAR. In certain embodiments, if the mapping and localization information from one system is unavailable, the AV 1102 uses mapping and localization information from a redundant system and/or from a remote data source.

In certain embodiments, the prediction stack 1116 receives information from the localization stack 1114 and objects identified by the perception stack 1112 and predicts a future path for the objects. In certain embodiments, the prediction stack 1116 output comprises several likely paths that an object is predicted to take along with a probability associated with each path. For each predicted path, the prediction stack 1116 also provides a range of points along the path corresponding to a predicted location of the object along the path at future time intervals along with an expected error value for each of the points that indicates a probabilistic deviation from that point.

In certain embodiments, the planning stack 1118 determines how to maneuver or operate the AV 1102 safely and efficiently in its environment. In certain embodiments, the planning stack 1118 receives the location, speed, and direction of the AV 1102, geospatial data, data regarding objects sharing the road with the AV 1102, e.g., pedestrians and/or vehicles, or certain events occurring during a trip, e.g., an emergency vehicle blaring a siren and/or a street closure, traffic rules and other safety standards or practices for the road, user input, and other relevant data for directing the AV 1102 from one point to another, and outputs from the perception stack 1112, the localization stack 1114, and the prediction stack 1116. In certain embodiments, the planning stack 1118 determines one or more sets of one or more mechanical operations that the AV 1102 can perform, e.g., go straight or turn and/or accelerate or maintain a constant speed or decelerate and/or activate a blinker, and select one or more operations to meet changing road conditions and events. In certain embodiments, the planning stack 1118 selects from multiple backup plans if something unexpected happens. For example, another vehicle may aggressively cut into the destination lane while the AV 1102 is preparing to change lanes, making the lane change unsafe. In certain embodiments, the planning stack 1118 had already determined one or more alternative plans for such an event and, upon an occurrence of the unexpected event, the planning stack 1118 directs the AV 1102 to implement one of the alternative plans, e.g., go around the block, instead of blocking a current lane while waiting for an opening to change lanes.

In certain embodiments, the control stack 1122 manages the operation of one or more of the vehicle propulsion system 1130, the braking system 1132, the steering system 1134, the safety system 1136, and the cabin system 1138. In certain embodiments, the control stack 1122 receives sensor signals from the sensor systems 1104-1108 as well as communicates with other stacks or components of the local computing device 1110 or a remote system, e.g., the data center 1150, to effectuate operation of the AV 1102. In certain embodiments, the control stack 1122 implements the final path or action from the multiple paths or actions provided by the planning stack 1118. In certain embodiments, this involves turning the routes and decisions from the planning stack 1118 into commands for the actuators that control the AV's steering, throttle, brake, and drive units.

In certain embodiments, the communications stack 1120 transmits and receives signals between the various stacks and other components of the AV 1102 and between the AV 1102 and the data center 1150, the client computing device 1170, and other remote systems. In certain embodiments, the communications stack 1120 enables the local computing device 1110 to exchange information remotely over a network, e.g., through an antenna array or interface that can provide a metropolitan WIFI network connection, a mobile or cellular network connection including Third Generation (3G), Fourth Generation (4G), Long-Term Evolution (LTE), 5th Generation (5G), and/or other wireless network connection, e.g., License Assisted Access (LAA), Citizens Broadband Radio Service (CBRS), MULTEFIRE systems. In certain embodiments, the communications stack 1120 facilitates the local exchange of information, through a wired connection, e.g., a mobile computing device docked in an in-car docking station or connected via Universal Serial Bus (USB), or a local wireless connection, e.g., a Wireless Local Area Network (WLAN), Low Power Wide Area Network (LPWAN), Bluetooth®, and/or an infrared device.

In certain embodiments, the HD geospatial database 1126 stores HD maps and related data of the streets upon which the AV 1102 travels. In certain embodiments, the HD maps and related data comprise multiple layers, such as an areas layer, a lanes and boundaries layer, an intersections layer, and a traffic controls layer. In certain embodiments, the areas layer includes geospatial information indicating geographic areas that are drivable, e.g., roads and parking areas and shoulders, and areas that are not drivable, e.g., medians and sidewalks and buildings. In certain embodiments, the drivable areas constitute links or connections, e.g., drivable areas that form the same road, versus intersections, e.g., drivable areas where two or more roads intersect. In certain embodiments, the lanes and boundaries layer includes geospatial information of road lanes, e.g., lane centerline and boundaries and/or types of lane boundaries, and related attributes, e.g., direction of travel and speed limit and lane type. In certain embodiments, the lanes and boundaries layer includes three-dimensional (3D) attributes related to lanes, e.g., slope and elevation and curvature. In certain embodiments, the intersections layer includes geospatial information of intersections, e.g., crosswalks and stop lines and turning lane boundaries, and related attributes, e.g., permissive or protected/permissive or protected-only left-turn lanes, legal or illegal u-turn lanes permissive or protected-only right turn lanes. In certain embodiments, the traffic controls layer includes geospatial information about traffic signal lights, traffic signs, and other road objects and related attributes.

In certain embodiments, the AV operational database 1124 stores raw AV data generated by the sensor systems 1104-1108, stacks 1112-1122, and other components of the AV 1102 and/or data received by the AV 1102 from remote systems, e.g., the data center 1150 and the client computing device 1170. In certain embodiments, the raw AV data includes one or more of HD LIDAR point cloud data, image data, RADAR data, GPS data, and other sensor data that the data center 1150 can use for creating or updating AV geospatial data or for creating simulations of situations encountered by AV 1102 for future testing or training of various machine learning algorithms that are incorporated in the local computing device 1110.

In certain embodiments, the data center 1150 includes a private cloud, e.g., an enterprise network or a co-location provider network, a public cloud, e.g., an IaaS network, a PaaS network, a SaaS network, a Cloud Service Provider (CSP) network, a hybrid cloud, a multi-cloud, and/or any other network. In certain embodiments, the data center 1150 includes one or more computing devices remote to the local computing device 1110 for managing a fleet of AVs and AV-related services. In certain embodiments, in addition to managing the AV 1102, the data center 1150 supports a ride-hailing service, e.g., one or more of a ridesharing service, a delivery service, a remote/roadside assistance service, and a street service such as street mapping or street patrol or street cleaning or street metering or parking reservation.

In certain embodiments, the data center 1150 sends and receives signals to and from the AV 1102 and the client computing device 1170. In certain embodiments, these signals can include one or more of sensor data captured by the sensor systems 1104-1108, roadside assistance requests, software updates, and ride-hailing/ridesharing pick-up and drop-off instructions. In certain embodiments, the data center 1150 includes one or more of a data management platform 1152, an Artificial Intelligence/Machine Learning (AI/ML) platform 1154, a simulation platform 1156, a remote assistance platform 1158, and a ride-hailing platform 1160, and a map management platform 1162.

In certain embodiments, the data management platform 1152 is a "big data" system capable of receiving and transmitting data at high velocities, e.g., near-real-time or real-time, processing a large variety of data and storing large volumes, e.g., terabytes or more, of data. In certain embodiments, the data has one or more of a plurality of data structures, e.g., structured or semi-structured or unstructured, one or more of a plurality of data types, e.g., sensor data or mechanical system data or ride-hailing service data or map data or video data, data associated with one or more of a plurality of data stores, e.g., relational databases, key-value stores, document databases, graph databases, column-family databases, data analytic stores, search engine databases, time series databases, object stores, and file systems. In certain embodiments, the data originates from one or more of a plurality of sources, e.g., AVs, enterprise systems, and social networks. In certain embodiments, the data has one or more of a plurality of rates of change, e.g., batch or streaming. In certain embodiments, the various platforms and systems of the data center 1150 access data stored by the data management platform 1152 to provide their respective services.

In certain embodiments, the AI/ML platform 1154 provides the infrastructure for training and evaluating machine learning algorithms for operating one or more of the AV 1102, the simulation platform 1156, the remote assistance platform 1158, the ride-hailing platform 1160, the map management platform 1162, and other platforms and systems. In certain embodiments, the data scientists use the AI/ML platform 1154 to prepare data sets from the data management platform 1152, select and/or design and/or train machine learning models, evaluate and/or refine and/or deploy the models, and maintain and/or monitor and/or retrain the models.

In certain embodiments, the simulation platform 1156 enables testing and validation of the algorithms, machine learning models, neural networks, and other development efforts for the AV 1102, the remote assistance platform 1158, the ride-hailing platform 1160, the map management platform 1162, and other platforms and systems. In certain embodiments, the simulation platform 1156 replicates a variety of driving environments and/or reproduce real-world scenarios from data captured by the AV 1102, including rendering geospatial information and road infrastructure, e.g., crosswalks and traffic lights, obtained from a cartography platform, e.g., map management platform 1162, modeling the behavior of dynamic elements, e.g., vehicles and pedestrians, and simulating inclement weather conditions and/or different traffic scenarios.

In certain embodiments, the remote assistance platform 1158 generates and transmit instructions regarding the operation of the AV 1102. In certain embodiments, the remote assistance platform 1158 can prepare instructions for one or more stacks or other components of the AV 1102 in response to an output of the AI/ML platform 1154 or another system of the data center 1150.

In certain embodiments, the ride-hailing platform 1160 interacts with a customer of a ride-hailing service via a ride-hailing application 1172 executing on the client computing device 1170. In certain embodiments, the client computing device 1170 is any type of computing system, e.g., a server, a desktop computer, a laptop computer, a tablet computer, a smartphone, a smart wearable device such as a smartwatch or smart eyeglasses or other Head-Mounted Display (HMD), smart ear pods or other smart in-ear/on-ear/over-ear device, or a gaming system. In certain embodiments, the client computing device 1170 is a customer's mobile computing device or a computing device integrated with the AV 1102, e.g., the local computing device 1110. In certain embodiments, the ride-hailing platform 1160 receives requests to pick up or drop off from the ride-hailing application 1172 and dispatch the AV 1102 for the trip.

In certain embodiments, the map management platform 1162 provides a set of tools for the manipulation and management of geographic and spatial/geospatial and related attribute data. In certain embodiments, the data management platform 1152 receives LIDAR point cloud data, image data, e.g., a still image or video, RADAR data, GPS data, and other sensor data from one or more AVs 1102, Unmanned Aerial Vehicles (UAVs), satellites, third-party mapping services, and other sources of geospatially referenced data. In certain embodiments, the raw data is processed and map management platform 1162 renders base representations, e.g., 2D tiles or 3D bounding volumes, of the AV geospatial data to enable users to view, query, label, edit, and otherwise interact with the data. In certain embodiments, the map management platform 1162 manages workflows and tasks for operating on the AV geospatial data. In certain embodiments, the map management platform 1162 controls access to the AV geospatial data, including granting or limiting access to the AV geospatial data based on user-based, role-based, group-based, task-based, and other attribute-based access control mechanisms. In certain embodiments, the map management platform 1162 provides version control for the AV geospatial data, such as tracking specific changes that (human or machine) map editors have made to the data and to revert changes when necessary. In certain embodiments, the map management platform 1162 administers release management of the AV geospatial data, including distribution of suitable iterations of the data to different users, computing devices, AVs, and other consumers of HD maps. In certain embodiments, the map management platform 1162 provides analytics regarding the AV geospatial data and related data, e.g., generates insights relating to the throughput and quality of mapping tasks.

In certain embodiments, the map viewing services of map management platform 1162 are modularized and deployed as part of one or more of the platforms and systems of the data center 1150. In certain embodiments, the AI/ML platform 1154 incorporates map viewing services for visualizing the effectiveness of various object detection or object classification models. In certain embodiments, the simulation platform 1156 incorporates the map viewing services for recreating and visualizing certain driving scenarios. In certain embodiments, the remote assistance platform 1158 incorporates the map viewing services for replaying traffic incidents to facilitate and coordinate aid. In certain embodiments, the ride-hailing platform 1160 incorporates the map viewing services into the ride-hailing application 1172 to enable passengers to view the AV 1102 en-route to a pick-up or drop-off location.

While the autonomous vehicle 1102, the local computing device 1110, and the autonomous vehicle environment 1100 are shown to include certain systems and components, one of ordinary skill will appreciate that the autonomous vehicle 1102, the local computing device 1110, and/or the autonomous vehicle environment 1100 can include more or fewer systems and/or components than those shown in FIG. 11. In certain embodiments, the autonomous vehicle 1102 includes other services than those shown in FIG. 11. In certain embodiments, the local computing device 1110 includes one or more memory devices, e.g., RAM or ROM, one or more network interfaces, e.g., wired and/or wireless communications interfaces, and/or other hardware or processing devices that are not shown in FIG. 11.

In summary, the disclosed systems and methods provide an empirically based simulation of the output of a LiDAR unit based on modeling real-world characteristics of fog and statistical utilization of the model to generate a simulated output of a LiDAR unit operating in a dispersive environment.

In the foregoing description, aspects of the application are described with reference to specific embodiments thereof, but those skilled in the art will recognize that the application is not limited thereto. While illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

In the above description, terms such as "upper," "upward," "lower," "downward," "above," "below," "longitudinal," "lateral," and the like, as used herein, are explanatory in relation to respective view of the item presented in the associated figure and are not limiting in the claimed use of the item. The term "outside" refers to a region that is beyond the outermost confines of a physical object. The term "inside" indicates that at least a portion of a region is partially contained within a boundary formed by the object.

The term "coupled" is defined as connected, whether directly or indirectly through intervening components, and is not limited to physical connections. The connection can be such that the objects are permanently connected or releasably connected.

The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language reciting "an item" or similar language indicates and includes one or more of the items. For example, claim language reciting "a part" means one part or multiple parts. Moreover, claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and β and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Statements of the disclosure include:

(A1) A method of simulating an effect of fog on a Light Detection And Ranging (LiDAR) sensor, comprising steps: (a) determining whether a target is present within the field-of-view (FOV) of the LiDAR sensor; (b) determining a fog probability density function ($PDF_{fog}$) vs range; (c) modifying, if a target is present within the FOV, the $PDF_{fog}$ to account for the target; (d) calculating a cumulative density function (CDF) for the $PDF_{fog}$; (e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR unit.

(A2) The method of A1, wherein: step (a) comprises determining a target distance ($z_{Target}$); and the modification of the $PDF_{fog}$ in step (c) comprises reducing the $PDF_{fog}$ to zero at ranges greater than $z_{Target}$.

(A3) The method of A2, wherein the modification of the $PDF_{fog}$ in step (c) comprises a loss term $\exp(-\gamma\ z_{Target})$ wherein y is a parameter related to fog severity.

(A4) The method of A1, wherein the sampling of the CDF in step (e) comprises inverse transform sampling.

(A5) The method of A1, wherein the additive plotting in step (e) comprises using a kernel density estimator (KDE).

(A6) The method of A1, wherein: step (b) comprises selecting values for fitting parameters: a shape parameter ($\alpha$) associated with the $PDF_{fog}$; a rate parameter ($\beta$) associated with the $PDF_{fog}$; a bandwidth (h) associated with a kernel density estimator (KDE); and a number (N) of how many times the sampling of the CDF is repeated; the method further comprises steps: (g) collecting a first plurality of LiDAR road data frames classified as "speckle" and a first plurality of actual strongest returns respectively associated with the LiDAR road data frames; (h) repeating steps (e) and (f) a second plurality of times to produce a second plurality of simulated strongest returns; (i) plotting a first histogram of the first plurality of actual strongest returns and a second histogram of the second plurality of simulated strongest returns; (j) calculating a quality metric comparing the first and second histograms.

(A7) The method of A6, wherein: step (j) comprises calculation of a Kullback-Leibler (KL) divergence.

(B8) A memory comprising instructions for simulating an effect of fog on a Light Detection And Ranging (LiDAR) sensor that, when loaded into a processor and executed, cause the processor to perform steps: (a) determining whether a target is present within the field-of-view (FOV) of the LiDAR sensor; (b) determining a fog probability density function ($PDF_{fog}$) vs range; (c) modifying, if a target is present within the FOV, the $PDF_{fog}$ to account for the target; (d) calculating a cumulative density function (CDF) for the $PDF_{fog}$; (e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR unit.

(B9) The memory of B8, wherein: step (a) comprises determining a target distance ($z_{Target}$); and the modification of the $PDF_{fog}$ in step (c) comprises reducing the $PDF_{fog}$ to zero at ranges greater than $z_{Target}$.

(B10) The memory of B9, wherein the modification of the $PDF_{fog}$ in step (c) comprises a loss term $\exp(-\gamma\ z_{Target})$ wherein y is a parameter related to fog severity.

(B11) The memory of B8, wherein the sampling of the CDF in step (e) comprises inverse transform sampling.

(B12) The memory of B8, wherein the additive plotting in step (e) comprises using a kernel density estimator (KDE).

(B13) The memory of B8, wherein: step (b) comprises selecting values for fitting parameters: a shape parameter ($\alpha$) associated with the $PDF_{fog}$; a rate parameter ($\beta$) associated with the $PDF_{fog}$; a bandwidth (h) associated with a kernel density estimator (KDE); and a number (N) of how many times the sampling of the CDF is repeated; the method further comprises steps: (g) collecting a first plurality of LiDAR road data frames classified as "speckle" and a first plurality of actual strongest returns respectively associated with the LiDAR road data frames; (h) repeating steps (e) and (f) a second plurality of times to produce a second plurality of simulated strongest returns; (i) plotting a first histogram of the first plurality of actual strongest returns and a second histogram of the second plurality of simulated strongest returns; (j) calculating a quality metric comparing the first and second histograms.

(B14) The memory of B13, wherein: step (j) comprises calculation of a Kullback-Leibler (KL) divergence.

(C15) A system for simulating an effect of fog on a Light Detection And Ranging (LiDAR) sensor, comprising: a processor communicatively coupled to the LiDAR sensor; and a memory communicatively coupled to the processor and comprising instructions that, when loaded into a processor and executed, cause the processor to perform steps: (a) determining whether a target is present within the fieldof-view (FOV) of the LiDAR sensor; (b) determining a fog probability density function ($PDF_{fog}$) vs range; (c) modifying, if a target is present within the FOV, the $PDF_{fog}$ to account for the target; (d) calculating a cumulative density function (CDF) for the $PDF_{fog}$; (e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR unit.

(C16) The system of C15, wherein: step (a) comprises determining a target distance ($z_{Target}$); and the modification of the $PDF_{fog}$ in step (c) comprises reducing the $PDF_{fog}$ to zero at ranges greater than $z_{Target}$.

(C17) The system of C16, wherein the modification of the $PDF_{fog}$ in step (c) comprises a loss term $\exp(-\gamma\ z_{Target})$ wherein y is a parameter related to fog severity.

(C18) The system of C15, wherein the sampling of the CDF in step (e) comprises inverse transform sampling.

(C19) The system of C15, wherein the additive plotting in step (e) comprises using a kernel density estimator (KDE).

(C20) The system of C15, wherein: step (b) comprises selecting values for fitting parameters: a shape parameter ($\alpha$) associated with the $PDF_{fog}$; a rate parameter ($\beta$) associated with the $PDF_{fog}$; a bandwidth (h) associated with a kernel density estimator (KDE); and a number (N) of how many times the sampling of the CDF is repeated; the instructions further cause the processor to execute steps: (g) collecting a first plurality of LiDAR road data frames classified as "speckle" and a first plurality of actual strongest returns respectively associated with the LiDAR road data frames; (h) repeating steps (e) and (f) a second plurality of times to produce a second plurality of simulated strongest returns; (i) plotting a first histogram of the first plurality of actual strongest returns and a second histogram of the second plurality of simulated strongest returns; (j) calculating a quality metric comparing the first and second histograms.

What is claimed is:

1. A method of simulating an effect of fog on a Light Detection And Ranging (LiDAR) sensor, comprising steps:

(a) determining whether a target is present within the field-of-view (FOV) of the LiDAR sensor;

(b) determining a fog probability density function ($PDF_{fog}$) vs range;

(c) modifying, if a target is present within the FOV, the $PDF_{fog}$ to account for the target;

(d) calculating a cumulative density function (CDF) for the $PDF_{fog}$;

(e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR sensor.

2. The method of claim 1, wherein:

step (a) comprises determining a target distance ($z_{Target}$); and the modification of the $PDF_{fog}$ in step (c) comprises reducing the $PDF_{fog}$ to zero at ranges greater than $z_{Target}$.

3. The method of claim 2, wherein the modification of the $PDF_{fog}$ in step (c) comprises a loss term $\exp(-\gamma\ z_{Target})$ wherein y is a parameter related to fog severity.

4. The method of claim 1, wherein the sampling of the CDF in step (e) comprises inverse transform sampling.

5. The method of claim 1, wherein the additive plotting in step (e) comprises using a kernel density estimator (KDE).

6. The method of claim 1, wherein:

step (b) comprises selecting values for fitting parameters:

a shape parameter ($\alpha$) associated with the $PDF_{fog}$;

a rate parameter ($\beta$) associated with the $PDF_{fog}$;

a bandwidth (h) associated with a kernel density estimator (KDE); and a number (N) of times the sampling of the CDF is repeated;

the method further comprises steps:

(g) collecting a first plurality of LiDAR road data frames classified as "speckle" and a first plurality of actual strongest returns respectively associated with the LiDAR road data frames;

(h) repeating steps (e) and (f) a second plurality of times to produce a second plurality of simulated strongest returns;

(i) plotting a first histogram of the first plurality of actual strongest returns and a second histogram of the second plurality of simulated strongest returns;

(j) calculating a quality metric comparing the first and second histograms.

7. The method of claim 6, wherein:

step (j) comprises calculation of a Kullback-Leibler (KL) divergence.

8. A non-transitory computer readable medium comprising instructions for simulating an effect of fog on a Light Detection And Ranging (LiDAR) sensor that, when loaded into a processor and executed, cause the processor to perform steps:

(a) determining whether a target is present within the field-of-view (FOV) of the LiDAR sensor;

(b) determining a fog probability density function (PDF-fog) vs range;

(c) modifying, if a target is present within the FOV, the PDFfog to account for the target;

(d) calculating a cumulative density function (CDF) for the PDFog;

(e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR sensor.

9. The non-transitory computer readable medium of claim 8, wherein:

step (a) comprises determining a target distance ($z_{Target}$); and the modification of the $PDF_{fog}$ in step (c) comprises reducing the $PDF_{fog}$ to zero at ranges greater than $z_{Target}$.

10. The non-transitory computer readable medium of claim 9, wherein the modification of the $PD_{Fog}$ in step (c) comprises a loss term exp $(-y\ z_{Target})$ wherein y is a parameter related to fog severity.

11. The non-transitory computer readable medium of claim 8, wherein the sampling of the CDF in step (e) comprises inverse transform sampling.

12. The non-transitory computer readable medium of claim 8, wherein the additive plotting in step (e) comprises using a kernel density estimator (KDE).

13. The non-transitory computer readable medium of claim 8, wherein:

step (b) comprises selecting values for fitting parameters:

a shape parameter (a) associated with the PDF fog;

a rate parameter (B) associated with the $PDF_{fog}$, a bandwidth (h) associated with a kernel density estimator (KDE); and a number (N) of times the sampling of the CDF is repeated; and further comprising:

(g) collecting a first plurality of LiDAR road data frames classified as "speckle" and a first plurality of actual strongest returns respectively associated with the LiDAR road data frames;

(h) repeating steps (e) and (f) a second plurality of times to produce a second plurality of simulated strongest returns;

(i) plotting a first histogram of the first plurality of actual strongest returns and a second histogram of the second plurality of simulated strongest returns;

(j) calculating a quality metric comparing the first and second histograms.

14. The non-transitory computer readable medium of claim 13, wherein:

step (j) comprises calculation of a Kullback-Leibler (KL) divergence.

15. A system for simulating an effect of fog on a Light Detection And Ranging (LiDAR) sensor, comprising:

a processor communicatively coupled to the LiDAR sensor; and a non-transitory computer readable medium communicatively coupled to the processor and comprising instructions that, when loaded into the processor and executed, cause the processor to perform steps:

(a) determining whether a target is present within the field-of-view (FOV) of the LiDAR sensor;

(b) determining a fog probability density function ($PDF_{fog}$) vs range;

(c) modifying, if a target is present within the FOV, the PDF fog to account for the target;

(d) calculating a cumulative density function (CDF) for the $PD_{Fog}$;

(e) randomly sampling the CDF to determine a plurality of ranges and additively plotting a predetermined Gaussian distribution centered on each range; and (f) identifying a peak value of the additive plot and reporting the range associated with the peak value as the strongest return of the LiDAR sensor.

16. The system of claim 15, wherein:

step (a) comprises determining a target distance ($z_{Target}$); and the modification of the $PDF_{fog}$ in step (c) comprises reducing the $PDF_{fog}$ to zero at ranges greater than $z_{Target}$.

17. The system of claim 16, wherein the modification of the $PDF_{fog}$ in step (c) comprises a loss term $\exp(-\gamma\, z_{Target})$ wherein y is a parameter related to fog severity.

18. The system of claim 15, wherein the sampling of the CDF in step (e) comprises inverse transform sampling.

19. The system of claim 15, wherein the additive plotting in step (e) comprises using a kernel density estimator (KDE).

20. The system of claim 15, wherein:

step (b) comprises selecting values for fitting parameters:

a shape parameter ($\alpha$) associated with the $PDF_{fog}$;

a rate parameter ($\beta$) associated with the $PDF_{fog}$;

a bandwidth (h) associated with a kernel density estimator (KDE); and a number (N) of times the sampling of the CDF is repeated;

the instructions further cause the processor to execute steps:

(g) collecting a first plurality of LiDAR road data frames classified as "speckle" and a first plurality of actual strongest returns respectively associated with the LiDAR road data frames;

(h) repeating steps (e) and (f) a second plurality of times to produce a second plurality of simulated strongest returns;

(i) plotting a first histogram of the first plurality of actual strongest returns and a second histogram of the second plurality of simulated strongest returns;

(j) calculating a quality metric comparing the first and second histograms.

* * * * *